United States Patent
Suzuki et al.

(10) Patent No.: US 6,409,590 B1
(45) Date of Patent: Jun. 25, 2002

(54) AIR GUIDE DUCT FOR VEHICLE

(75) Inventors: Hiroshi Suzuki; Kazushi Shikata; Shigeo Numazawa; Tomohiro Kamiya, all of Aichi (JP)

(73) Assignees: Inoac Corporation; Denso Corporation, both of Aichi (JP)

( * ) Notice: Subject to any disclaimer, the term of this patent is extended or adjusted under 35 U.S.C. 154(b) by 0 days.

(21) Appl. No.: 09/721,622

(22) Filed: Nov. 27, 2000

(30) Foreign Application Priority Data

Nov. 26, 1999 (JP) ........................................... 11-336849
Oct. 11, 2000 (JP) ....................................... 2000-311127

(51) Int. Cl.[7] ................................................ B60H 1/00
(52) U.S. Cl. .......................... 454/143; 296/70; 454/121
(58) Field of Search ................................ 454/121, 127, 454/143; 296/208, 190.09, 70

(56) References Cited

U.S. PATENT DOCUMENTS 4,522,114 A * 6/1985 Matsuno ..................... 454/121
5,354,114 A * 10/1994 Kelman et al. ............. 296/192
5,712,764 A * 1/1998 Baker et al. ................ 361/690
5,904,617 A * 5/1999 Dausch ......................... 454/69
6,048,263 A * 4/2000 Uchida et al. .............. 454/121
6,110,037 A * 8/2000 Yoshinaka ................... 454/143

* cited by examiner

Primary Examiner—Harold Joyce
Assistant Examiner—Derek S. Boles
(74) Attorney, Agent, or Firm—Sughrue Mion, PLLC (57) ABSTRACT

There is provided an air guide duct for a vehicle, the air guide duct connected for communication with an air conditioner unit provided in a passengers' room in a vehicle, the air guide duct adapted to pass and guide temperature regulated air supplied from the air conditioner unit, the air guide duct comprising a first base body constituting one duct half, the first base body including a mounting part for allowing a wire element of an electrical component system to be contained along the air guide duct, and a second base body constituting the other duct half, the second base body covered over the first base body to define an air flowing space therebetween, the second base body including a cover piece which laterally extends from the duct, wherein the mounting part containing the wire element is so constructed as to be covered with the cover piece.

16 Claims, 11 Drawing Sheets

AIR GUIDE DUCT FOR VEHICLE

BACKGROUND OF THE INVENTION

1. Field of the Invention

The present invention relates to an air guide duct for a vehicle, and more particularly, to an improvement of the air guide duct which is disposed inside vehicle interior members such as an instrument panel, a floor console, a ceiling panel etc. so as to communicate air outlets provided in the interior members with an air conditioner unit thereby guiding temperature regulated air from the air conditioner unit to the air outlets.

2. Background of the Invention

Inside a cockpit in a vehicle such as an automobile, there are mounted various vehicle interior members such as a instrument panel on which various types of on-vehicle equipments such as a meter board, an air conditioner operating panel, an audio unit, and so on are installed, a floor console disposed on a floor between a driver's seat and an passenger's seat, and a ceiled panel attached to a ceiling of the cockpit. In a forward area of the cockpit, there is installed an air conditioner unit adapted to be operated and controlled by means of the above mentioned air conditioner operating panel in a state covered with the instrument panel. Temperature regulated air which has been adjusted to a determined temperature in the air conditioner unit is blown out from air blowoff parts (air outlets) provided in outer faces of, for example, the aforesaid instrument panel, the floor console, the ceiling panel and so on into the passengers' room. In particular, there are provided, inside the vehicle interior members, the air guide ducts connecting the aforesaid air conditioner unit with the air outlets. The temperature regulated air from the air conditioner unit is guided to the respective air outlets through these air guide ducts.

Various on-vehicle electronic equipments such as the above mentioned air conditioner unit, meter board, air conditioner operating panel, audio unit and so on are mounted on the vehicle. These on-vehicle electronic equipments are electrically connected by means of a number of wire harnesses (wire elements) which are arranged in the rear of the vehicle interior members, and a system of electrical components is constituted by these wire harnesses.

In the meantime, in the forward part of the cockpit, there is disposed a reinforce bar which is a vehicle body reinforcing member intended to enhance rigidity of the vehicle body, in a state where it is covered with the aforesaid instrument panel. This reinforce bar extends in a transverse direction of the vehicle with its both ends fixed to both side parts of the vehicle body. Accordingly, the reinforce bar has also a function of installing and fixing the air conditioner unit, a steering shaft and an air bag unit and so on, in addition to a function as the reinforcing member intended to enhance the rigidity of the vehicle body. In particular, the air conditioner unit is fixed to the vehicle body at a plurality of positions, some of which are located in the reinforce bar.

The above described air guide duct is a complicatedly crooked hollow member which has across section of a rectangular, circular, or strange shape. A main stream of the air guide duct is an integrally molded article which has been blow molded from raw material such as high density polyethylene (HDPE), for example. Although such blow molded air guide duct has advantages that it has appropriate rigidity, it is light weighted, and it can be molded at low cost, it has a drawback that in case where a large difference in temperature exists between an interior air flowing space and the exterior, condensation is likely to occur because of small thickness of the air guide duct. Therefore, there have been such inconveniences that when water drops are formed from this condensation and fall on steel components such as the vehicle body, brackets, and so on, this will be a cause of rust, or when the water drops fall on the aforesaid wire harnesses or the electrical equipments of the electrical component system, this will cause a short circuit or incur malfunction or breakdown of the on-vehicle equipments. Further, unpleasant noises may sometimes occur in the event that a duct body formed of polyethylene comes in contact with other members. For this reason, countermeasures for preventing the condensation and the strange noise have been taken by applying a urethane sheet or the like around an outer peripheral face of the duct. However, it has been a problem that cost for material of the urethane sheet and assembly process are required, and production cost will be increased. Still further, it has been pointed out that since the air conditioner unit and the air outlets spatially communicate with each other by way of the air guide ducts, operating noises of a blower which is driven by the air conditioner unit spread in the air flowing space in the air guide duct and are leaked into the cockpit.

Moreover, the wire harnesses of the aforesaid electrical component system are appropriately bundled by means of binding tapes, binding belt or the like in their parts extending between the electronic equipments, and fixed for wiring to the vehicle body or the like at appropriate intervals by means of engaging members. However, in many cases, the wire harnesses are kept exposed while extending inside the aforesaid vehicle interior members. Therefore, there has been a fear that the wire harnesses may oscillate with vibrations of the vehicle body while driving, may come into contact with other members, or may be partially pulled. There has been a further anxiety that in some cases, a conductive wire may be exposed due to wear of covering material, resulting in a short circuit or a break of the wire. Furthermore, since the wiring arrangement and the binding work of the wire harnesses are rather annoying and time consuming, it has been sought for to realize rationalization and simplification of the work.

In addition, the air conditioner unit is fixed to the above described reinforce bar in a directly contacted manner, and therefore, vibrations of the blower and a compressor while the air conditioner unit is operating are directly transmitted to the reinforce bar. Accordingly, the vibrations of the air conditioner unit are transmitted to the aforesaid steering shaft which is connected to the reinforce bar, and it has been pointed out that the vibrations will give unpleasant feeling to the driver who is handling the steering wheel.

SUMMARY OF THE INVENTION

The invention has been proposed in order to solve the above described problems, and it is an object of the invention to provide an air guide duct for a vehicle which consists of a first base body molded from resin sheet material having rigidity and a second base body formed of foamed resin sheet material which is excellent in heat insulating, sound insulating noise absorbing and vibration damping performance to integrally form a mounting part capable of containing a duct for guiding temperature regulated air, wire harnesses and so on, whereby prevention of condensation, prevention of occurrence of strange noises, noise absorption, etc. associated with the duct are made possible, and at the same time, which is so constructed as to realize protection of the wire harnesses and rationalization of the wiring work, and in which a part of the second base member can be utilized as vibration damping material and the sound proofing material with respect to the air conditioner unit.

In order to solve the above described problems and attain the intended objects, there is provided according to an aspect of the present invention, an air guide duct which is connected for communication with an air conditioner unit provided in a cockpit in a vehicle and adapted to pass and guide temperature regulated air supplied from the air conditioner unit, wherein the air guide duct includes a first base body constituting one duct half and a second base body constituting the other duct half which is covered over the first base body to define an air flowing space therebetween, the first base body including a mounting part which allows wire elements of an electrical component system or the like to be contained along the duct, the second base body including a cover piece which laterally extends from the duct, and the mounting part containing the wire elements is so constructed as to be covered with the cover piece.

Similarly, in order to solve the above described problems and attain the intended objects, there is provided according to another aspect of the invention, an air guide duct which is connected for communication with an air conditioner unit provided in a cockpit in a vehicle and adapted to pass and guide temperature regulated air supplied from the air conditioner unit, wherein the air guide duct includes a first base body molded from resin sheet material having rigidity and constituting one duct half, and a second base body molded from foamed resin sheet material and constituting the other duct half which is covered over the first base body to define an air flowing space therebetween, the first base body including a mounting part which allows wire elements of an electrical component system or the like to be contained along the duct, the second base body including a cover piece which laterally extends from the duct, and the mounting part containing the wire elements is so constructed as to be covered with the cover piece.

Similarly, in order to solve the above described problems and attain the intended objects, there is provided according to a still further aspect of the invention, an air guide duct which is connected for communication with an air conditioner unit provided in a passengers' room in a vehicle in a state where the duct is fixed to a vehicle body reinforcing member and adapted to pass and guide temperature regulated air supplied from the air conditioner unit, wherein the air guide duct includes a first base body molded from resin sheet material having rigidity and constituting one duct half, and a second base body molded from foamed resin sheet material and constituting the other duct half which is covered over the first base body to define an air flowing space therebetween, the first base body including a mounting part which allows wire elements of an electrical component system or the like to be contained along the duct, the second base body including a cover piece which laterally extends from the duct, the mounting part containing the wire elements being covered with the cover piece, and the second base body is so constructed as to include an elongated portion formed by elongating a portion of the cover piece, the elongated portion being interposed between the air conditioner unit and the vehicle body reinforcing member at a position where the air conditioner unit is fixed to the vehicle body reinforcing member thereby acting as vibration damping material with respect to the air conditioner unit.

BRIEF DESCRIPTION OF THE DRAWINGS

FIG. 7 is a sectional view of the first base body molded from resin sheet material and the second base body molded from foamed resin sheet material as shown in a state where they have been connected to each other in a longitudinal direction.

DETAILED DESCRIPTION OF THE PRESENT INVENTION

Now, the air guide duct for the vehicle according to the invention will be described below by way of preferred embodiments referring to the attached drawings. In these embodiments, an explanation will be made with respect to the air guide duct adapted to be disposed inside the instrument panel which is a vehicle interior member.

First Embodiment

Figure 1:
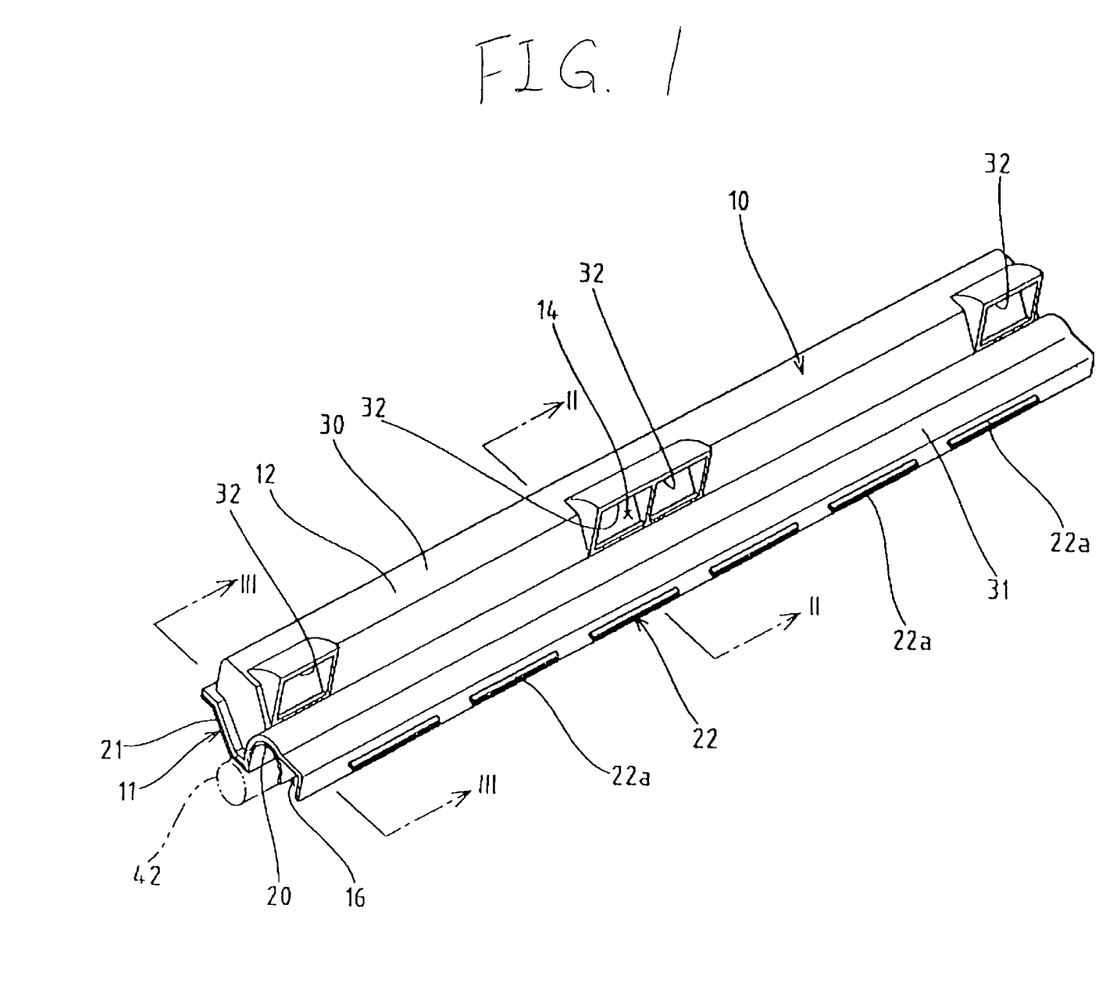
FIG. 1 is a perspective view of an air guide duct for a vehicle according to a first embodiment of the invention.
Figure 2:
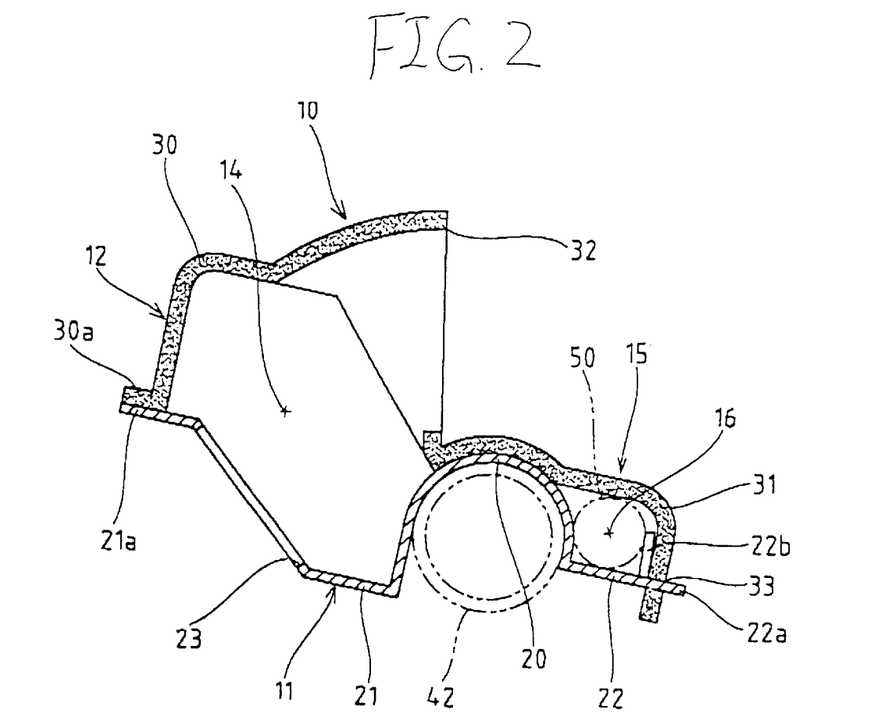
FIG. 2 is a sectional view taken along a line II—II in FIG. 1.
Figure 3:
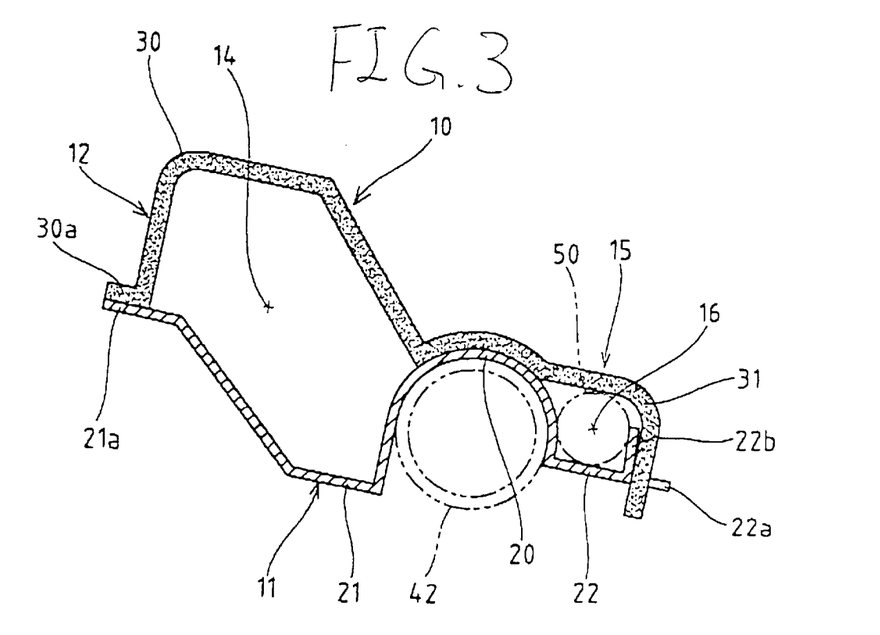
FIG. 3 is a sectional view taken along a line III—III in FIG. 1.
Figure 4:
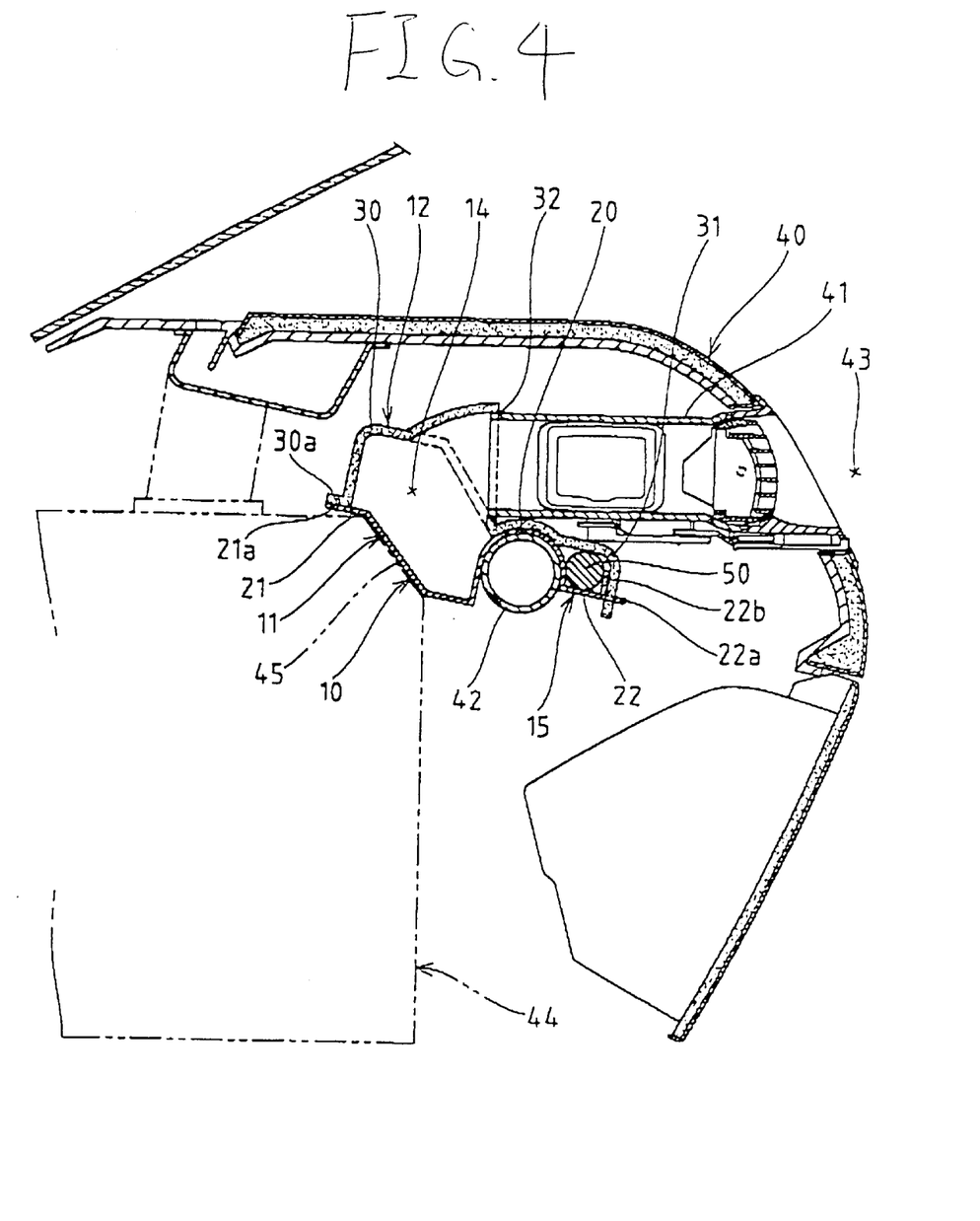
FIG. 4 is a sectional vertical view showing the air guide duct in the embodiment in a state where it is attached and fixed to a reinforce bar inside an instrument panel.

FIG. 1 is a perspective view of an air guide duct 10 according to a first embodiment of the present invention, FIG. 2 is a sectional view taken along a line II—II in FIG. 1, FIG. 3 is a sectional view taken along a line III—III in FIG. 1, and FIG. 4 is a sectional side view showing a state wherein the air guide duct 10 as shown in FIG. 1 is installed inside an instrument panel 40. The air guide duct 10 in this embodiment consists of a first base body 11 formed of a resin sheet material having a determined thickness and a second base body 12 formed of foamed resin sheet material having a determined thickness. These first base body 11 and the second base body 12 are connected to each other in a longitudinal direction to form an elongated rectilinear hollow body and to integrally form a mounting part 15 for containing and protecting wire harnesses (wire elements) 50 of an electrical component system. The air guide duct 10 is designed on the premise that it is directly fixed to a reinforce bar 42 which is a vehicle body reinforcing member, and adapted to extend inside the instrument panel 40 in a transverse direction of the vehicle body.

(The First Base Body)

Figure 5:
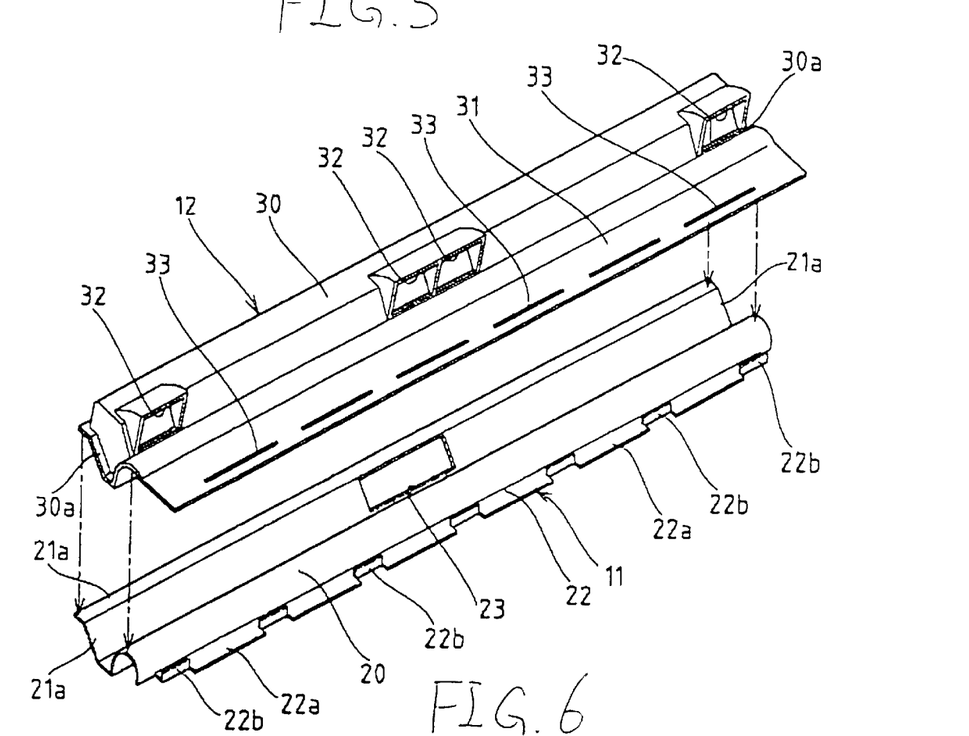
FIG. 5 is a perspective view of a first base body molded from resin sheet material and a second base body molded from foamed resin sheet material as shown in a state just before they are connected to each other in a longitudinal direction.

The above described first base body 11 which constitutes a lower half of the air guide duct 10 is a molded member which has been integrally molded from a rectangular resin sheet material of, for example, polyethylene, polypropylene or the like into a desired shape employing vacuum molding technique. The first base body is composed of a fitting and fixing part 20 which is formed in a semicircular shape in cross section so as to be tightly fitted to the reinforce bar 42, since it is premised to be fixed to the reinforce bar 42, a first duct wall 21 which is continuously provided along one side (forward side of the vehicle body) of the fitting and fixing part 20 to substantially constitute the duct 10, and a mount receiving piece 22 which is continuously provided along the other side (backward side of the vehicle body) of the fitting and fixing part 20 to define a mounting part 15 for wire harness 50 and so on. The first duct wall 21 is provided at a laterally central position with an air flow inlet 23 communicating with air feeding part 45 of an air conditioner unit 44 as shown in FIGS. 2 and 5. Such first base body 11 as described has rigidity enough to retain a shape of itself, and the above described fitting and fixing part 20 is provided with brackets (not shown) for fixing it to the reinforce bar 42.

(The Second Base Body)

The above described second base body 12 which constitutes an upper half of the air guide duct 10 is a molded member which has been integrally molded from foamed resin sheet material made of, for example, foamed polyethylene, foamed polypropylene or the like having 25 times of blowing ratio and a desired thickness into a desired shape with employing vacuum molding technique. The second base body 12 consists of a second duct wall 30 of an elongated funnel shape which substantially constitutes the duct 10 in cooperation with the above described first duct wall 21 of the first base body 11 on the premise that it fits on the first base body 11, and a cover piece 31 which extends above the aforesaid mount receiving piece 22. At left and right ends and at the middle of the aforesaid second duct wall 30, there are formed air flow outlets 32 to which the air outlets 41 mounted on the instrument panel 40 are connected in alignment, as shown in FIGS. 1, 2 and 4. The second base body 12 made of such foamed resin sheet material has no adequate rigidity by itself. However, the second base body 12 is light weighted as compared with blow-molding resin material having the same thickness, and has excellent heat insulating property due to its low heat conductivity, as well as excellent performance in sound proofing and sound absorption. Preferably, a shape retaining member having rigidity may be provided or interposed around each open mouth of the air flow outlets 32, thereby preventing the shape of the air flow outlets 32 from being deformed.

(Connection Between the First Base Body and the Second Base Body)

Figure 7:
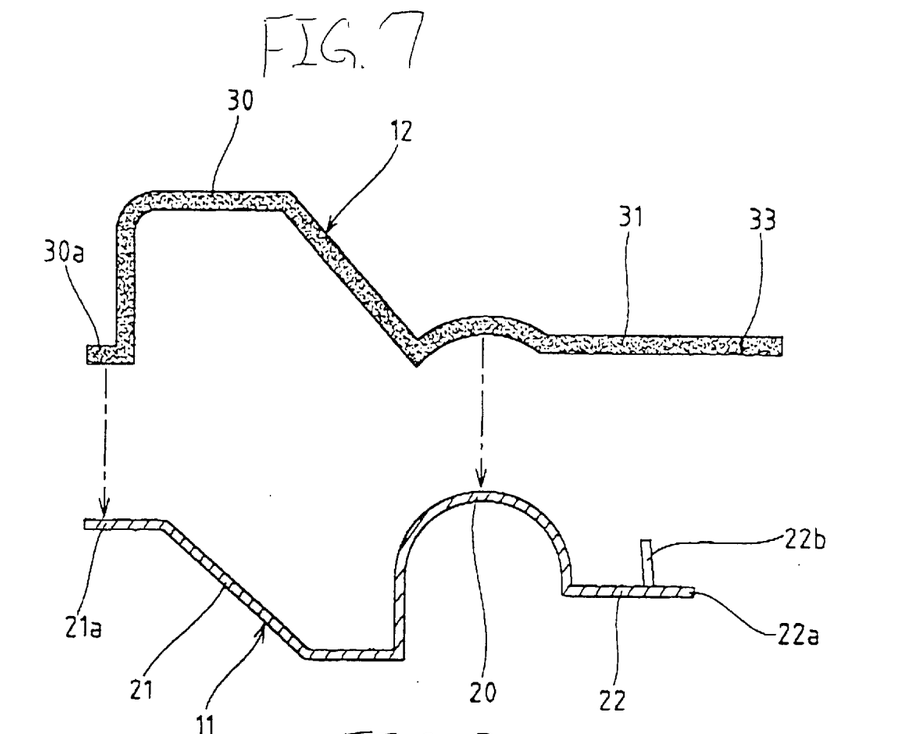
FIG. 7 is a sectional view of the first base body molded from resin sheet material and the second base body molded from foamed resin sheet material as shown in a state just before they are connected to each other in a longitudinal direction.
Figure 8:
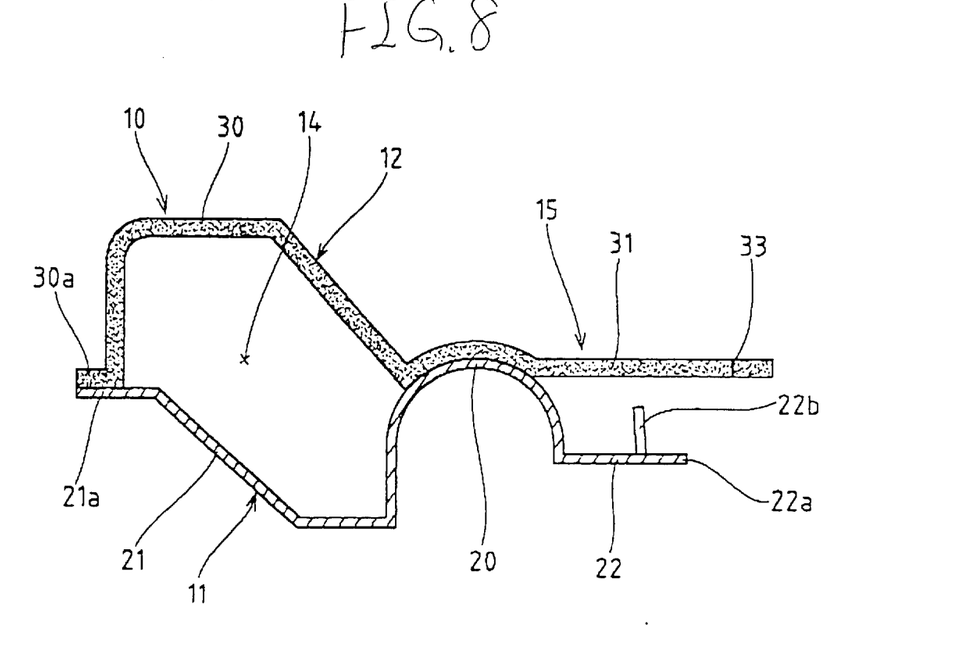

The first base body 11 and the second base body 12 which have been vacuum molded as described above are adapted to form the air guide duct 10 which defines an air flowing space 14 inside, by tightly fitting the outer peripheral edge 21a (including an upper face of the aforesaid fitting and fixing part 20) of the first duct wall 21 in the first base body 11 to the outer peripheral edge 30a of the second duct wall 30 in the second base body 12, as shown in FIGS. 5, 7 and 8. The connection between both the outer peripheral edges 21a and 30a of the first base body 11 and the second base body 12 may be preferably made employing various methods such as, for example, bonding with bonding agent, vibration welding (fusing), heat welding (fusing) by means of a hot plate, ultrasonic welding, etc. The second base body 12 which has been connected to the first base body 11 having the rigidity may be allowed to be partially deformed, but restrained from an overall flexible deformation.

When the air guide duct 10 in this embodiment which has been thus formed is fixed to the vehicle body with its fitting and fixing part 20 tightly fitted to the aforesaid reinforce bar 42, the aforesaid air flow inlet 23 aligns with the aforesaid air feeding part 45 of the air conditioner unit 44, thereby allowing the air conditioner unit 44 to spatially communicate with the air flowing space 14. Moreover, the respective air outlets 41 are so designed as to align with the corresponding aforesaid air flow outlets 32 when the instrument panel 40 provided with the aforesaid air outlets 41 is assembled to the vehicle body in a state where the above described air guide duct 10 is fixed to the reinforce bar 42. This allows the air flowing space 14 in the duct 10 to spatially communicate with the air outlets 41.

(Mounting Part)

Figure 6:
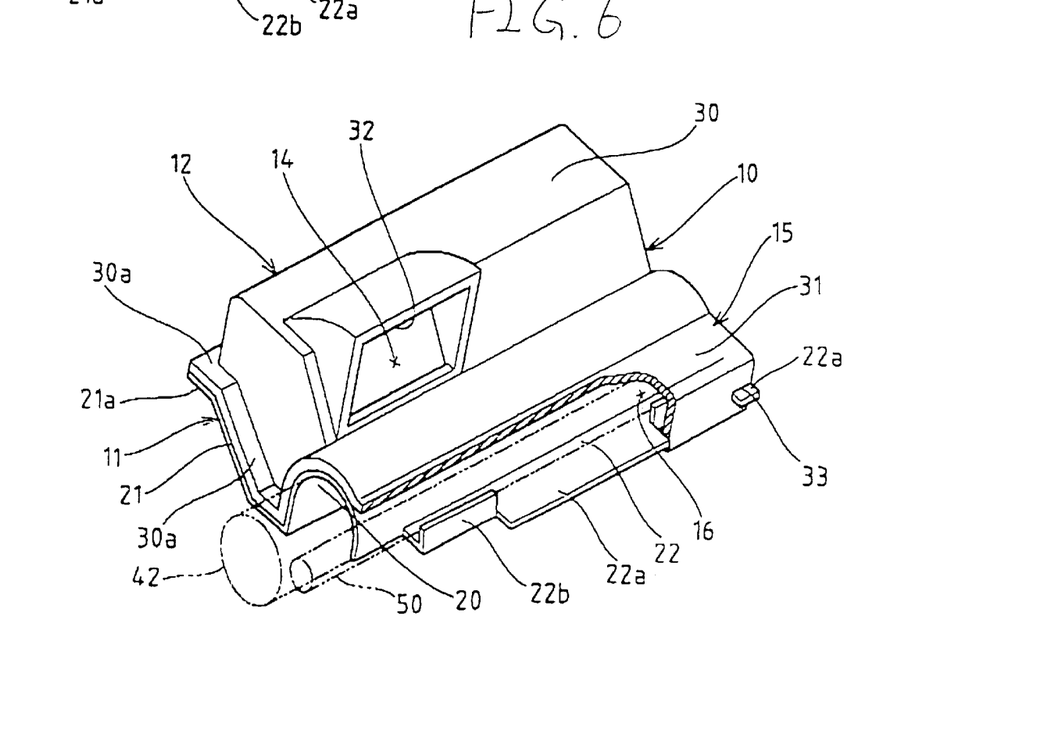
FIG. 6 is a perspective view, partly cut away, of an end portion of the air guide duct as shown in FIG. 1.
Figure 9:
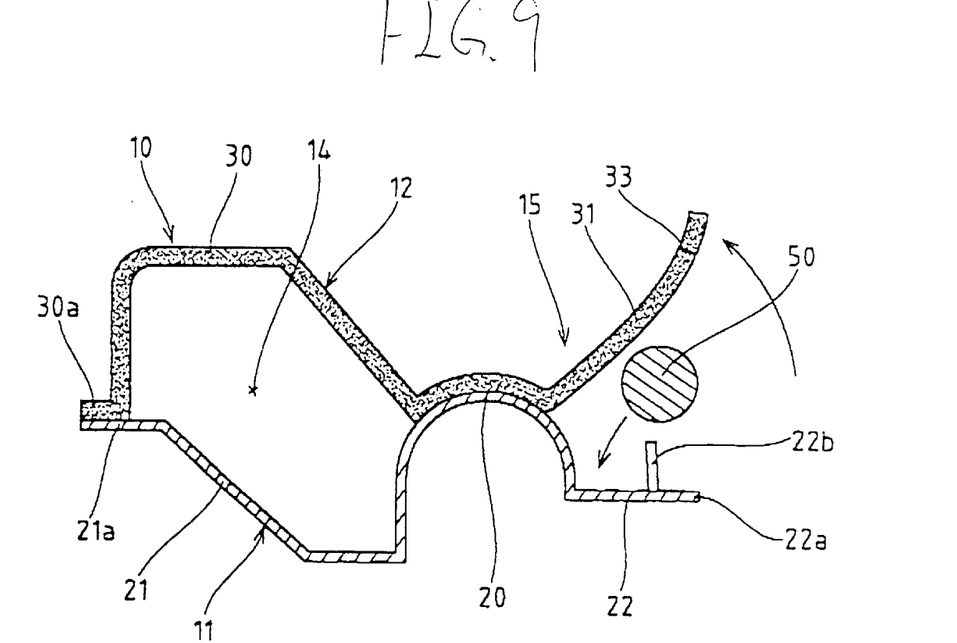
FIG. 9 is a sectional view showing a state where a wire harness of an electrical component system is being contained in a mounting part which is formed at a side of the air guide duct.
Figure 10:
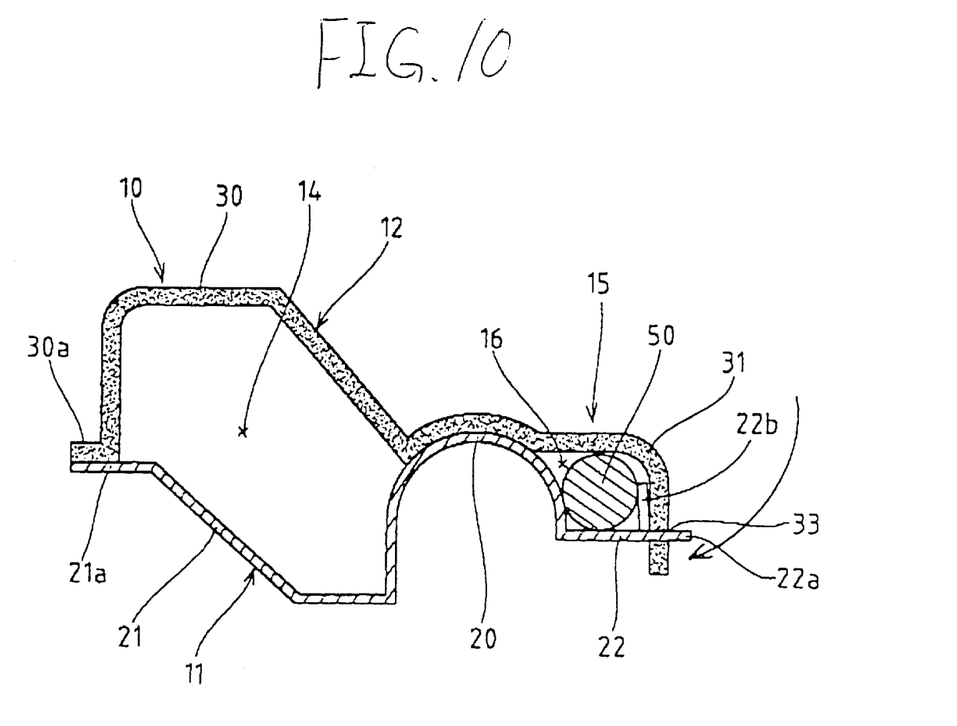
FIG. 10 is a sectional side view showing a state where the wire harness of the electrical component system has been contained in the mounting part and covered with a cover piece.

In the air guide duct 10 in this embodiment, there can be formed a mounting space 16 which allows a wire harness 50 of the electrical component system, for example, to be contained therein by means of the mount receiving piece 22 in the aforesaid mounting part 15 of the first base body 11 and the aforesaid cover piece 31 of the second base body 12. In particular, as shown in FIGS. 5 and 6, the mount receiving piece 22 in the mounting part 15 consists of horizontal pieces 22a which extend substantially horizontally from the aforesaid fitting and fixing part 20, and a plurality of vertical pieces 22b which are positioned at a desired interval in a longitudinal direction of the horizontal pieces 22a and formed by bending edges off the horizontal pieces 22a upward. On the other hand, the cover piece 31 is positioned so as to correspond to the above described horizontal pieces 22a and provided with rectilinear slits 33 which have the same length as the horizontal pieces 22a. Accordingly, as shown in FIGS. 9 and 10, when the wire harness 50 is set from the above with respect to the mounting part 15, and then, the cover piece 31 is deformed so as to cover the wire harness 50 to insert tip ends of the horizontal pieces 22a into the slits 33, the cover piece 31 is adequately expanded and deformed to be locked in a manner of covering the mounting part 15. Thus, the wire harness 50 is pushed into the mounting space 16 which is defined by the mounting part 15 and the cover piece 31, and fixed to be retained so that it cannot easily move, because back and forth, left and right, and up and down movements may be preferably restrained.

(Function in the First Embodiment)

Now, function of the air guide duct for the vehicle according to the embodiment which is constructed as described above will be explained.

The first base body 11 is vacuum molded from the resin sheet material made of polyethylene or polypropylene, while the second base body 12 is vacuum molded from the foamed resin sheet material made of polyethylene or polypropylene. The first base body 11 and the second base body 12 which have been formed into desired shapes are aligned in a longitudinal direction, as shown in FIG. 7, and connected to each other with their outer peripheral edges 21a, 30a tightly fitted, by employing the methods such as bonding with bonding agent, vibration welding (fusing), heat welding (fusing) by means of a hot plate, ultrasonic welding, etc.. In this manner, the air guide duct 10 integrally provided with the mounting part 15 is formed (FIG. 8). Prior to the connection between both the base bodies 11, 12, the air flow inlet 23 is formed in the first base body 11 and the air flow outlets 32 are formed in the second base body 12 in advance.

The air guide duct 10 which has been formed by connecting the first base body 11 and the second base body 12 is fitted and fixed to the reinforce bar 42 by means of brackets (not shown) or the like provided on the first base body 11. Then, the air flow inlet 23 formed in the first base body 11 is brought in alignment with the air feeding part 45 in the air conditioner unit 44. After the wire harness 50 of the electrical component system has been set on the mount receiving piece 22, the cover piece 31 is locked on the horizontal pieces 22a of the mount receiving piece 22 thereby enabling the mounting part 15 to cover and contain the wire harness 50.

Then, the instrument panel 40 provided with the air outlets 41 is assembled to the vehicle body from the back side of the cockpit 43, and the respective air outlets 41 are brought into alignment with the corresponding air flow outlets 32 and connected therewith. In this manner, the air feeding part 45 in the air conditioner unit 44 and the air outlets 41 are spatially communicated by way of the air flow inlet 23, the air flowing space 14, and the air flow outlets 32.

When function of the air conditioner unit 44 has been initiated by actuating an air conditioner operating panel (not shown) provided on the instrument panel 40, the air regulated to a determined temperature in the air conditioner unit 44 flows from the air feeding part 45 into the air flowing space 14 by way of the air flow inlet 23. The temperature regulated air which has moved in the air flowing space 14 moves from the air flow outlets 32 to the corresponding air outlets 41, and thereafter, is blown out toward the back side of the passengers' room 43.

Because substantially the upper half of the air guide duct 10 in the above described embodiment is composed of the second base body 12 which has excellent heat insulating property, occurrence of condensation on a surface of the air guide duct 10 and resulting fall of water drops are expected to considerably decrease, even though there is a large temperature difference between the air flowing space 14 (the interior) and inside of the instrument panel 40 (the exterior). Therefore, malfunctions, breakdowns, or short circuits of the on-vehicle electronic appliances will not be incurred, even though the on-vehicle electronic appliances and the wire harness of the electrical component system are disposed below the air guide duct 10. Moreover, formation of rust on steel products such as the vehicle body, etc. due to the fall of the water drops will be favorably prevented.

Further, because the aforesaid second base body 12 is excellent in noise erasing property and sound absorbing property, occurrence of strange noises will be favorably prevented, even in case where the on-vehicle appliances and other wire harnesses than the aforesaid wire harness 50 are in contact with the second base body 12. Still further, since operating noise of the blower which operates in the air conditioner unit 44 will be absorbed by the aforesaid second base body 12, a leak of the operating noise through the air flowing space 14 and the air outlets 41 to the cockpit will be favorably prevented.

Additionally, in the air guide duct 10 in this embodiment, a number of the wire harnesses 50 of the electrical component system are set in a bundle on the mount receiving piece 22 of the mounting part 15, and covered with the cover piece 31 of the second base body 12. Accordingly, such inconveniences that the wire harnesses 50 oscillate or are pulled due to vibration of the vehicle while driving will be avoided favorably. Moreover, the wire harnesses 50 can be simply and easily disposed on the mount receiving piece 22 of the mounting part 15 by hooking the slits 33 in the cover piece 31 over the horizontal pieces 22a of the mount receiving piece 22, and necessity of locking means for locking them to the vehicle body will be eliminated. Therefore, rationalization of the wiring works and decrease in the cost can be attained.

Additionally, because the air guide duct 10 in this embodiment rectilinearly extends along the reinforce bar 42, which provides a shortest distance of communication between the air conditioner unit 44 and the air outlets 41, increase of flow resistance of the temperature regulated air and drop of the air conditioning efficiency can be depressed to the minimum limit. Still further, since the air guide duct 10 is positioned adjacent to the reinforce bar 42, and the wire harnesses 50 are contained in the mounting part 15, the space in the instrument panel 40 occupied by them will be minimized, and mounting space for other on-vehicle appliances (air bags, etc.) can be enlarged.

(Variation of the First Embodiment)

Figure 11:
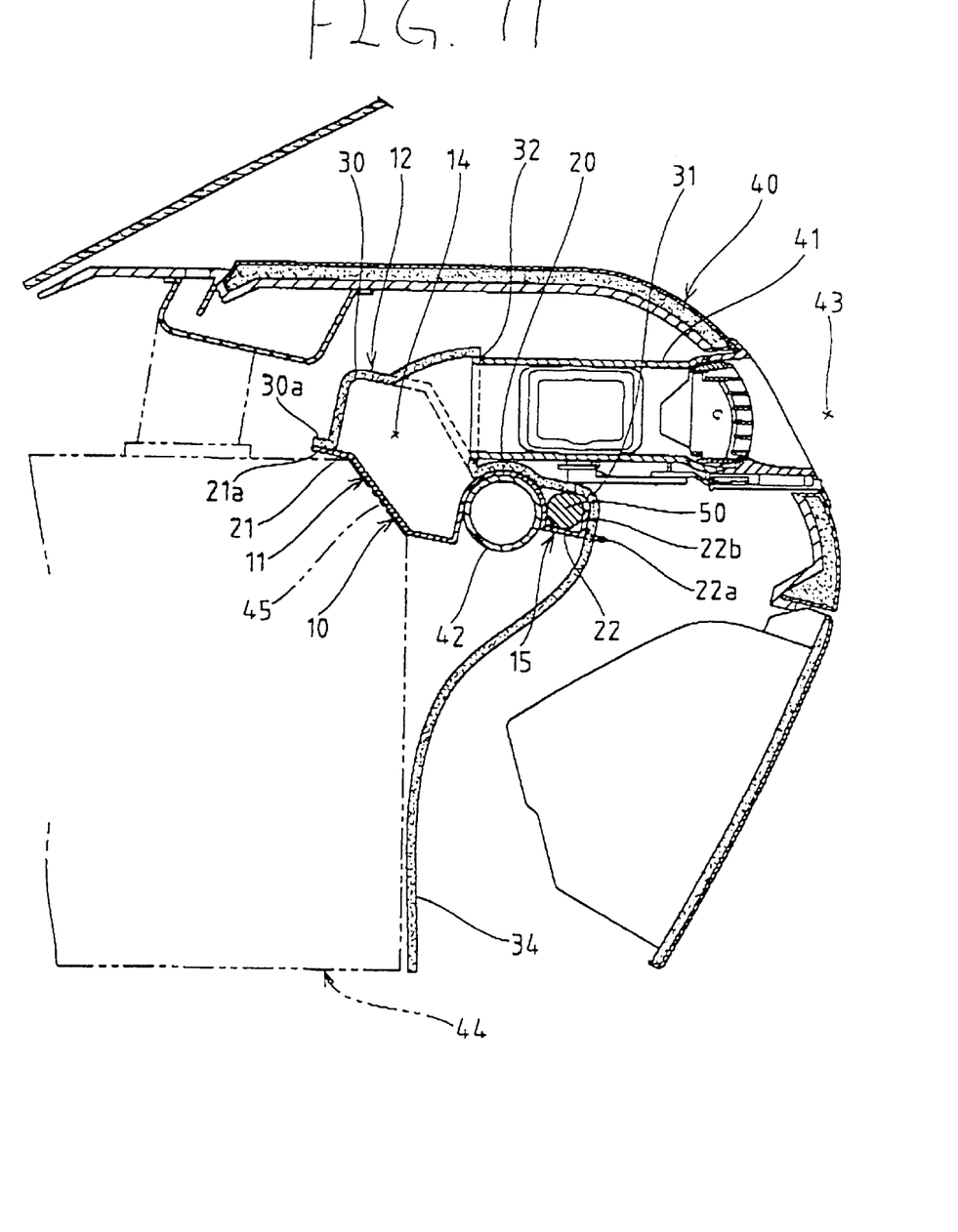
FIG. 11 is a sectional vertical view showing the air guide duct according to a variation of the first embodiment in a state where it is attached and fixed to the reinforce bar inside the instrument panel and an elongated portion of the cover piece is suspended in front of an air conditioner unit.

FIG. 11 is a sectional side view showing an air guide duct for a vehicle according to another embodiment of the first embodiment in a state where it is installed inside the instrument panel 40. In the air guide duct 10 in this embodiment, the foamed resin sheet material forming the aforesaid second base body 12 is made larger in size, while the second duct wall 30 is formed essentially the same, and the cover piece 31 is elongated to a large extent. In other words, an elongated portion 34 of the elongated cover piece 31 is suspended downward to be positioned near the air conditioner unit 44, thereby to separate the mounting side of the air conditioner unit 44 from the side of the passengers' room 43. As the foamed resin sheet material forming this second base body 12 has excellent noise erasing property and sound proofing property as described before, the above described elongated portion 34, if positioned in front of the air conditioner unit 44, will serve as a suitable sound insulating material. In this manner, sound insulating effect against not only the operating noise in the air conditioner unit 44 but also sound of the engine and road noise passing through a fire wall can be expected to be enhanced.

Figure 12:
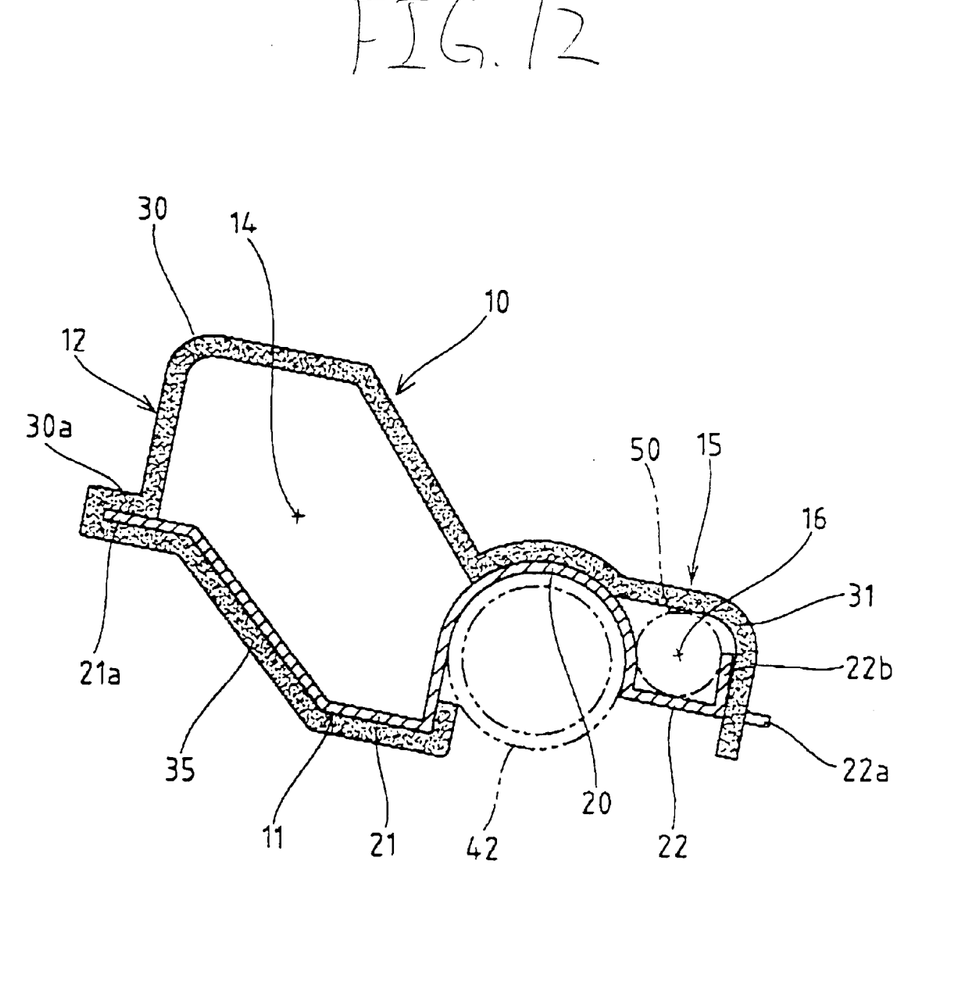
FIG. 12 is a sectional vertical view showing the air guide duct according to another variation of the first embodiment in a state where an elongated portion of the second base body is extended along an outer face of the first base body.

FIG. 12 is a sectional side view showing an air guide duct for a vehicle according to another variation of the first embodiment of the invention. In the air guide duct 10 in this embodiment, the foamed resin sheet material forming the aforesaid second base body 12 is made larger in size, while the cover piece 31 is formed essentially the same as the above described embodiment, and an end of the second duct wall 30 is elongated. In other words, an elongated portion 35 of the elongated second duct wall 30 is folded back around an end of the outer peripheral edge 21a of the first duct wall 21 to extend along an outer face of the first duct wall 21 thereby covering the first duct wall 21 from the outside. As the foamed resin sheet material forming this second base body 12 has excellent heat insulating property as described before, it will serve as a suitable heat insulating material for the first duct wall 21. In this manner, the whole of the air flowing space 14 in the air guide duct 10 is surrounded by the foamed resin sheet material, and the heat insulating effect is further enhanced whereby the occurrence of the condensation can be almost completely prevented.

Although not specifically shown in the drawings, provided that the foamed resin sheet material forming the aforesaid second base body 12 is made further larger in size to provide the aforesaid elongated portion 34 on the cover piece 31 and the elongated portion 35 on the end of the second duct wall 30, they can possess, at the same time, both functions as the sound insulating material with respect to the air conditioner unit 44 and as the heat insulating material with respect to the first duct wall 21.

The Second Embodiment

Figure 13:
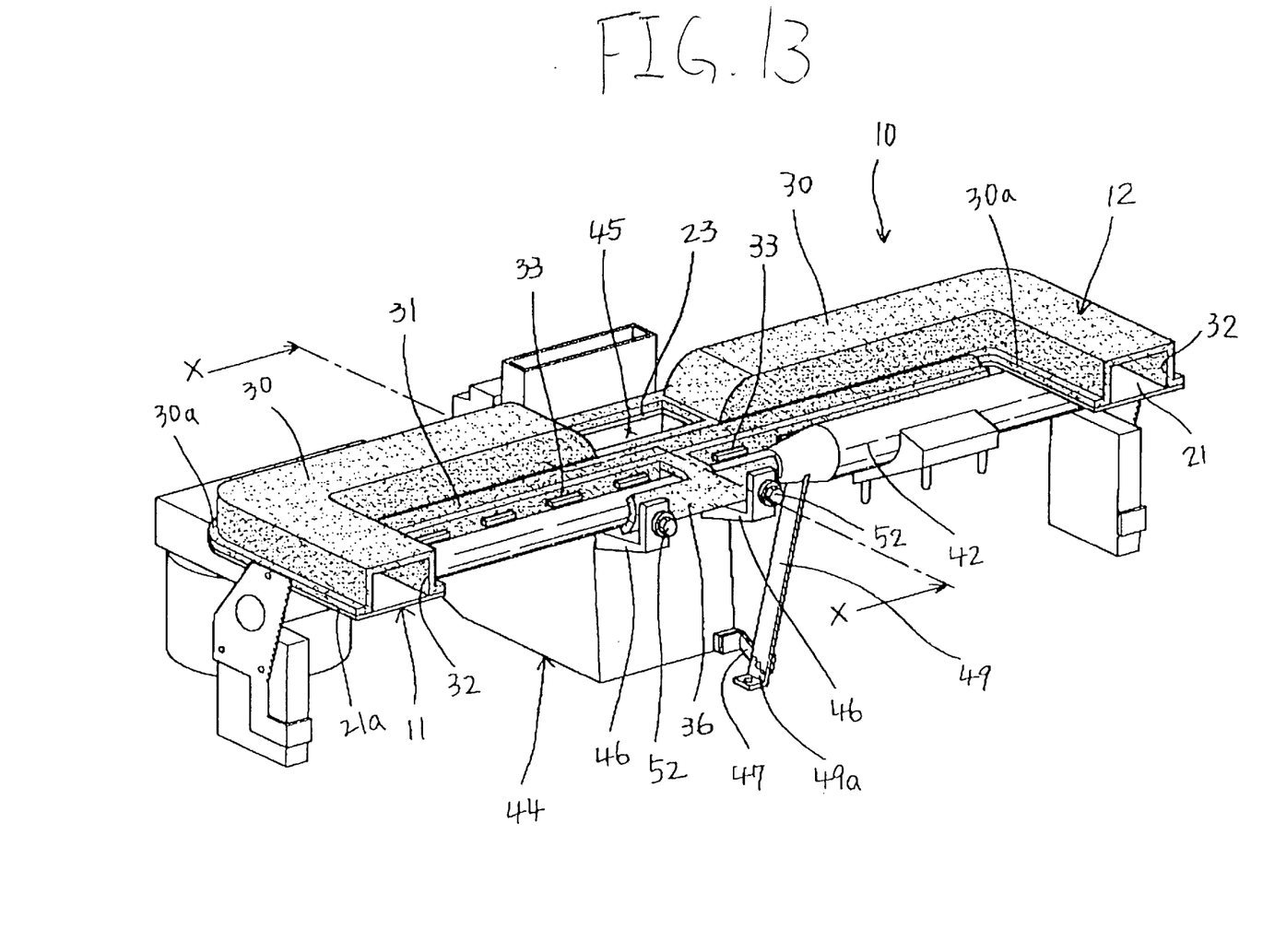
FIG. 13 is a perspective view showing the air guide duct according to a second embodiment of the invention in a state where an elongated portion of the second base body is interposed between the air conditioner unit and the reinforce bar at a position where the air conditioner unit is fixed to the reinforce bar.
Figure 14:
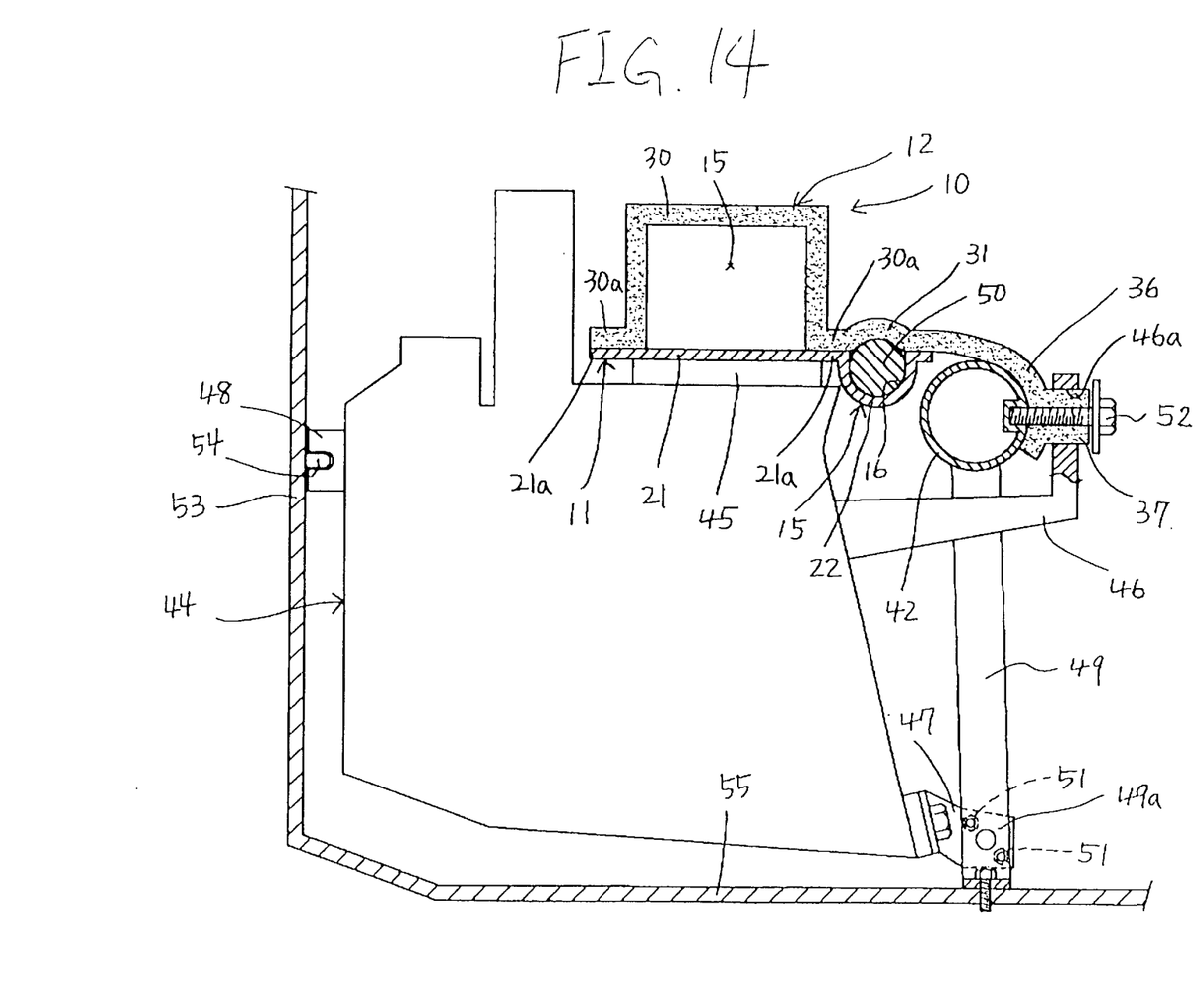
FIG. 14 is a sectional view taken along a line X—X in FIG. 13.

FIGS. 13 and 14 are a perspective view and a sectional side view of an air guide duct for a vehicle according to a second embodiment of the invention. In the air guide duct 10 in this embodiment, the foamed resin sheet material forming the aforesaid second base body 12 is partially made larger in size, and a middle portion of the cover piece 31 in a longitudinal direction is elongated. Although the first base body 11 and the second base body 12 are different in shape from those of the above described first embodiment, the first base member 11 is molded from resin sheet material having rigidity to form one duct half, and the second base body 12 is molded from foamed resin sheet material to form the other duct half. The air flowing space 14 is defined inside by joining the first base body 11 and the second base body 12. This embodiment is substantially the same as the air guide duct 10 in the aforesaid first embodiment in that the aforesaid first base body 11 is provided with the mounting part 15 allowing the wire elements 50 of the electrical component system to be contained along the duct 10, while the aforesaid second base body 12 is provided with the cover piece 31 laterally extending from the duct 10 and adapted to cover the mounting part 15 containing the above described wire elements 50.

In the air guide duct 10 in this embodiment, on the premise that the aforesaid air conditioner unit 44 is fixed to the vehicle body at a plurality of positions including the aforesaid reinforce bar 42 as the vehicle body reinforcing member, an elongated portion 36 in a substantially T-shape which is elongated from the second duct wall 30 is interposed between first brackets 46 which constitute parts of the air conditioner unit 44 and the reinforce bar 42 at positions where the brackets 46 are fixed to the reinforce bar 42 so that both the members 42 and 44 (46) may not directly contact with each other. As the foamed resin sheet material forming this second base body 12 has excellent vibration damping and vibration insulating property besides the noise erasing property and the sound proofing property, the above described elongated portion 36 interposed between the air conditioner unit 44 and the reinforce bar 42 acts as vibration damping material which favorably shuts off vibrations of the blower or the compressor occurring during the operation of the air conditioner unit 44 from being transmitted to the aforesaid reinforce bar 42.

Figure 15:
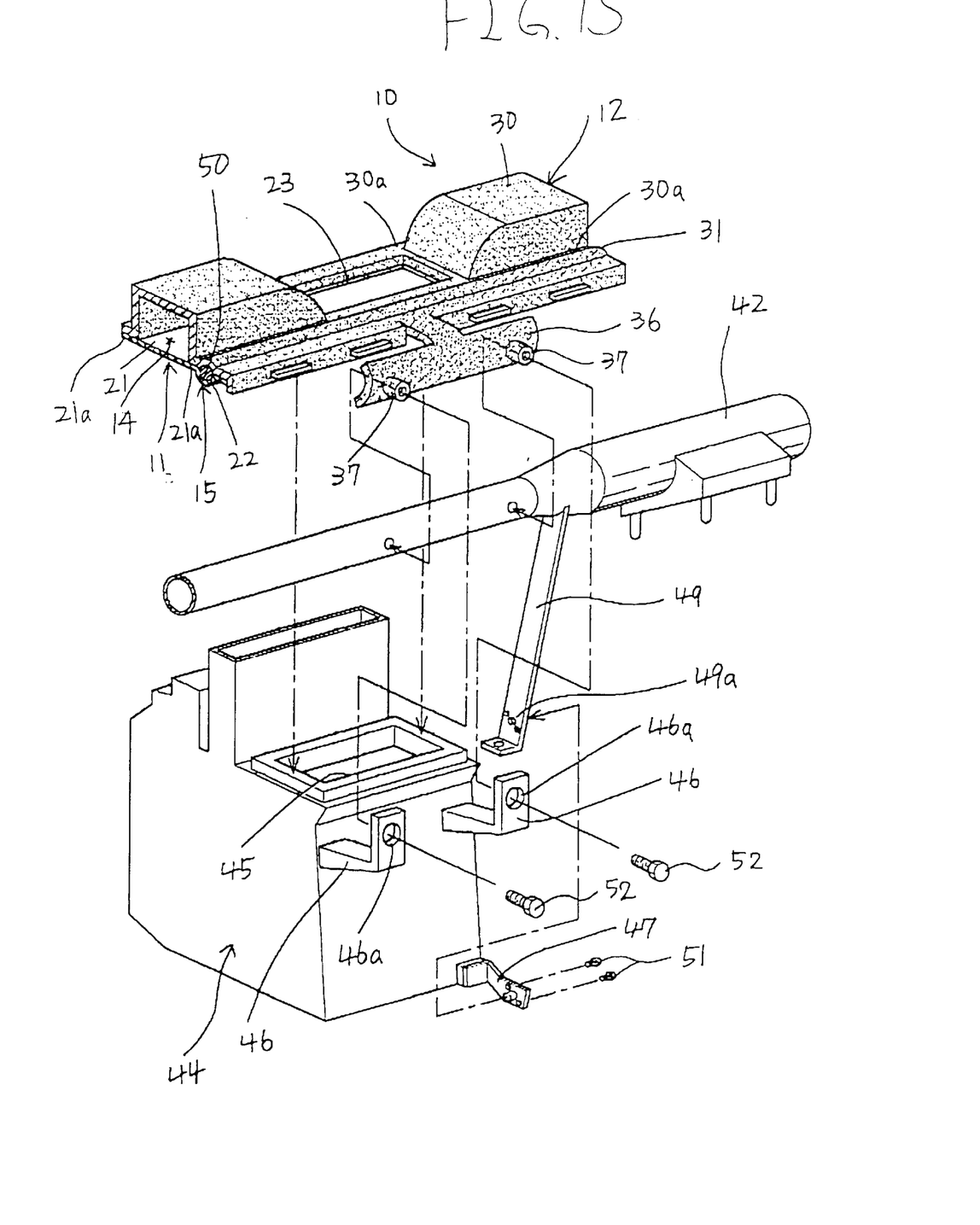
FIG. 15 is a partial perspective view showing a state where on the premise of a module structure, the air guide duct is being assembled to the air conditioner unit, and the air conditioner unit is being assembled to the reinforce bar while the elongated portion of the air guide duct is being interposed.

In the second embodiment, the aforesaid air guide duct 10, the air conditioner unit 44, and the reinforce bar 42 are exemplified in a form of a module structure wherein they are assembled to each other in advance prior to being mounted on the vehicle body. In such a form, the above described elongated portion 36 will serve also as a positioning member on occasion of assembling the air conditioner unit 44 to the reinforce bar 42. In particular, prior to being mounted on the vehicle body, as shown in FIG. 15, the aforesaid air guide duct 10 in which the first base body 11 and the second base body 12 are connected with each other is assembled to an upper part of a casing of the air conditioner unit 44 in a state where the duct is connected to and communicated with the air feeding part 45. In the meantime, the air conditioner unit 44 provided with the air guide duct 10 is connected to the reinforce bar 42 by connecting a second bracket 47 provided on a lower part of a front face of the unit 44 to a lower end 49a of a support member 49 which is suspended from the reinforce bar 42 by means of a bolt 51, and by connecting the aforesaid first brackets 46 to the reinforce bar 42 by means of bolts 52. On this occasion, tubular projections 37 integrally formed with the aforesaid elongated portion 36 are fitted to through holes 46a in the aforesaid first brackets 46 and the bolts 52 are inserted and screwed in the tubular projections 37. Accordingly, the reinforce bar 42 and the bolts 52 screwed into the reinforce bar 42 will not directly contact with the first brackets 46 because of presence of the elongated portion 36 and the aforesaid tubular projections 37. In other words, in a case of the module structure as the premise, on occasion of connecting the air conditioner unit 44 to the reinforce bar 42 by means of the aforesaid first brackets 46 and the second bracket 47, both the members 42 and 44 can be favorably positioned, by interposing the elongated portion 36 and the tubular projections 37 which constitute parts thereof between the reinforce bar 42 and the air conditioner unit 44.

In assembling the modularized air guide duct 10, the air conditioner unit 44 and the reinforce bar 42 to the vehicle body, by positioning the reinforce bar 42 at a desired position in the vehicle body, a third bracket 48 provided on a back face of the air conditioner unit 44 is automatically engaged with a stud 54 provided on a fire wall 53 which constitutes a part of the vehicle body, and thus the back side of the air conditioner unit 44 is fixed to the vehicle body. Accordingly, the air conditioner unit 44 which has been assembled to the vehicle body is directly fixed to the vehicle body by way of the aforesaid third bracket 48, and indirectly fixed to the reinforce bar 42 which constitutes a part of the vehicle body by way of the first brackets 46 and the second bracket 47. However, because the aforesaid support member 49 is fixed to a floor panel 55 of the vehicle body at the lower end 49a to which the third bracket 48 is fixed, the lower part of the front side of the air conditioner unit 44 is in the same condition as it is directly assembled to the vehicle body. Therefore, because the first brackets 46 are indirectly connected to the reinforce bar 42 by way of the aforesaid elongated portion 36 and the tubular projections 37, and the second bracket 47 is indirectly connected to the reinforce bar 42 by way of the aforesaid support member 49, the air conditioner unit 44, after completion of assembling to the vehicle body, is not directly in contact with the reinforce bar 42, and the operating vibration of the air conditioner unit 44 will not be transmitted to the reinforce bar 42 by the presence of the aforesaid elongated portion 36 and the tubular projections 37.

In this manner, in the air guide duct 10 of the second embodiment, on the premise that the air guide duct 10, the air conditioner unit 44 and the reinforce bar 42 are in a form of the module, the aforesaid elongated portion 36 (and the tubular projections 37) serves as the positioning member, prior to assembling to the vehicle body, while the aforesaid elongated portion 36 (and the tubular projections 37) serves as the vibration damping member after the completion of assembling to the vehicle body.

It is to be noted that the respective modes of the first embodiment may be applied to the air guide duct 10 in the second embodiment. Specifically, provided that the foamed resin sheet material forming the second base body 12 is made larger in size, and the elongated portion formed at the end of the cover piece 31 is positioned near the air conditioner unit 44, the function as the sound insulating material with respect to the air conditioner unit 44 can be added. Further, provided that the foamed resin sheet material forming the second base body 12 is made larger in size, and the elongated portion formed at the end of the second duct wall 30 is extended along the outer face of the first base body 11, the function as the heat insulating material with respect to the duct 10 can be added. Of course, provided that the aforesaid second base body is made further larger, the function as the sound insulating material with respect to the air conditioner unit 44 as well as the function as the heat insulating material with respect to the duct 10 can be added at the same time.

In the first embodiment and the second embodiment as described above, the case wherein the first base body 11 is formed of the resin sheet material having rigidity, and the second base body 12 is formed of the foamed resin sheet material has been exemplified. However, the first base body 11 may be also formed of the foamed resin sheet material. By thus constructing, further enhanced heat insulating property and sound insulating property can be anticipated.

Further, both the first base body 11 and the second base body 12 may be molded from powdered resin material employing powder slush molding technique.

Still further, in the above described embodiments, the air guide duct 10 installed inside the instrument panel 40 has been described. However, the air guide duct according to the invention can be preferably applied to the air guide duct which is installed inside the vehicle interior members such as the floor console, the ceiling panel and so on.

As described above, in the air guide duct for the vehicle according to the first embodiment, by connecting the first base body molded from the resin sheet material and the second base body molded from the foamed resin sheet material at their end portions, at least substantially half of the duct wall defining the air flowing space is formed of the foamed resin sheet material which is excellent in heat insulating property. In this manner, occurrence of condensation on the surface of the duct and the resulting fall of water drops can be favorably prevented while retaining the rigidity as the duct. Accordingly, malfunction, break down, or short circuit of the on-vehicle electronic appliances can be prevented, and at the same time, occurrence of rust on the steel components such as the vehicle body can be favorably prevented. Moreover, because the second base body has excellent property in sound absorbing performance and sound proofing performance, the inconveniences such as occurrence of strange noises due to contact with other members and leakage of the operating noises in the air conditioner unit to the cockpit can be favorably prevented.

Further, the air guide duct for the vehicle can receive and hold the wire elements of the electrical component system by means of the mounting part formed in the first base body and the cover piece formed in the second base body. With this structure, it is advantageous that the inconveniences that the wire elements of the electrical component system are oscillated or pulled with vibration of the vehicle while driving are favorably avoided, and at the same time, rationalization of the assembly of the wire elements and decrease of the cost can be attained. Moreover, provided that the foamed resin sheet material forming the second base body is set larger thereby to elongate the cover piece, and the elongated portion is positioned near the air conditioner unit, it can function as the sound insulating material which insulates the operating noise in the air conditioner unit. Still further, provided that the foamed resin sheet material forming the second base body is set larger thereby to elongate the end of the second duct wall, and the elongated portion is extended along the outer face of the first base body, almost whole of the air flowing space is surrounded by the foamed resin sheet material and the heat insulating effect is further enhanced, whereby occurrence of the condensation can be almost perfectly prevented.

On the other hand, in the air guide duct of the second embodiment, the foamed resin sheet material forming the second base body is set larger thereby to elongate a portion of an end of the second duct wall, and the elongated portion is interposed between the air conditioner unit and the vehicle body reinforcing member adapted to fix the unit at the position where the air conditioner unit is fixed to the vehicle body reinforcing member. This enables the elongated portion to function as the vibration damping material with respect to the vehicle reinforcing member, and in addition to the effects similar to those of the aforesaid first embodiment, a further effect of favorably shutting off transmission of the operating vibration of the air conditioner unit to the vehicle reinforcing member can be attained. Moreover, in case of the module structure wherein the duct, the air conditioner unit and the vehicle reinforcing member are assembled to each other in advance prior to being mounted on the vehicle body, the elongated portion can function as the positioning member, and favorable positioning of the air conditioner unit with respect to the vehicle reinforcing member can be attained.

What is claimed is:

1. An air guide duct for a vehicle, the air guide duct connected for communicating with an air conditioner unit provided in a cockpit in a vehicle, the air guide duct adapted to pass and guide temperature regulated air supplied from the air conditioner unit, the air guide duct comprising:

a first base body constituting one duct half, the first base body including a mounting part for allowing a wire element of an electrical component system to be contained along the air guide duct; and a second base body constituting the other duct half, the second base body covered over the first base body to define an air flowing space therebetween, the second base body including a cover piece which laterally extends from the duct;

wherein the mounting part containing the wire element is covered with the cover piece.

2. The air guide duct according to claim 1, wherein the first base body is molded from resin sheet material having rigidity, the second base body is molded from foamed resin sheet material.

3. The air guide duct according to claim 2, the air guide duct fixed to a vehicle body reinforcing member, wherein the second base body includes an elongated portion formed by elongating the cover piece, the elongated portion interposed between the air conditioner unit and the vehicle body reinforcing member at a position where the air conditioner unit is fixed to the vehicle body reinforcing member, the elongated portion acting as vibration damping material with respect to the air conditioner unit.

4. The air guide duct according to claim 1, wherein the first base body includes: a first duct wall substantially constituting the one duct half of the air guide duct; and a mount receiving piece constituting the mounting part, and the second base body includes: a second duct wall substantially constituting the other duct half of the air guide duct; and the cover piece extending from the second duct wall in a transverse direction of the air guide duct, wherein ends of the first duct wall and the second duct wall are connected, and ends of the mount receiving piece and the cover piece is connected with each other to define an mounting space for containing the wire element.

5. The air guide duct according to claim 2, wherein the cover piece of the foamed resin sheet material forming the second base body is elongated to form an elongated portion, and the elongated portion is positioned near the air conditioner unit, whereby the elongated portion acts as sound insulating material with respect to the air conditioner unit.

6. The air guide duct for a vehicle according to claim 2, wherein an end of the second duct wall of the foamed resin sheet material forming the second base body is elongated to form an elongated portion, and the elongated portion is extended along an outer face of the first base body, whereby the elongated portion acts as heat insulating material with respect to the first base body.

7. The air guide duct for a vehicle as claimed in claim 3, wherein, the air guide duct, the air conditioner unit and the vehicle body reinforcing member are assembled to each other in advance prior to being mounted on the vehicle, and the elongated portion interposed between the vehicle reinforcing member and the air conditioner unit acts as a positioning member, when the air conditioner unit is assembled to the vehicle body reinforcing member.

8. An air guide duct for a vehicle, the air guide duct comprising:

a first base body including a mounting part for containing a wire element of an electrical component system; and a second base body covered over the first base body to define an air passage between the first base body and the second base body, the second base body including a cover piece covering the mounting portion containing the wire element.

9. The air guide duct according to claim 8, wherein the air passage adapted to pass and guide temperature regulated air supplied from an air conditioner unit to an inside of the vehicle.

10. The air guide duct according to claim 8, wherein the first base body is molded from resin sheet material having rigidity, and the second base body is molded from foamed resin sheet material.

11. The air guide duct according to claim 8, wherein at least one of the first base body or second base body is fixed to a vehicle body reinforcing member of the vehicle.

12. The air guide duct according to claim 8, wherein the second base body includes an elongated portion elongating from the cover piece, the elongated portion interposed between an air conditioner unit of the vehicle and the vehicle body reinforcing member, the elongated portion for damping vibration of the air conditioner unit.

13. The air guide duct according to claim 8, wherein the first base body includes a first duct wall and a mount receiving piece constituting the mounting part;

the second base body includes a second duct wall connected with the first duct wall and the cover piece extending from the second duct wall;

the mount receiving piece and the cover piece is connected with each other to define an mounting space for containing the wire element.

14. The air guide duct according to claim 8, wherein the second base body includes an elongated portion elongating from the cover piece, and the elongated portion is positioned near an air conditioner unit of the vehicle, the elongated portion for insulating sounds of the air conditioner unit.

15. The air guide duct according to claim 8, wherein the second base body includes an elongated portion elongating from the cover piece, and the elongated portion is extended along an outer face of the first base body, the elongated portion for insulating heat of the first base body.

16. The air guide duct according to claim 12, wherein, the air guide duct, the air conditioner unit and the vehicle body reinforcing member are assembled to each other in advance prior to being mounted on the vehicle, and the elongated portion is interposed between the vehicle reinforcing member and the air conditioner unit for positioning the vehicle reinforcing member and the air conditioner unit, when the air conditioner unit is assembled to the vehicle body reinforcing member.

* * * * *